United States Patent Office 2,796,330
Patented June 18, 1957

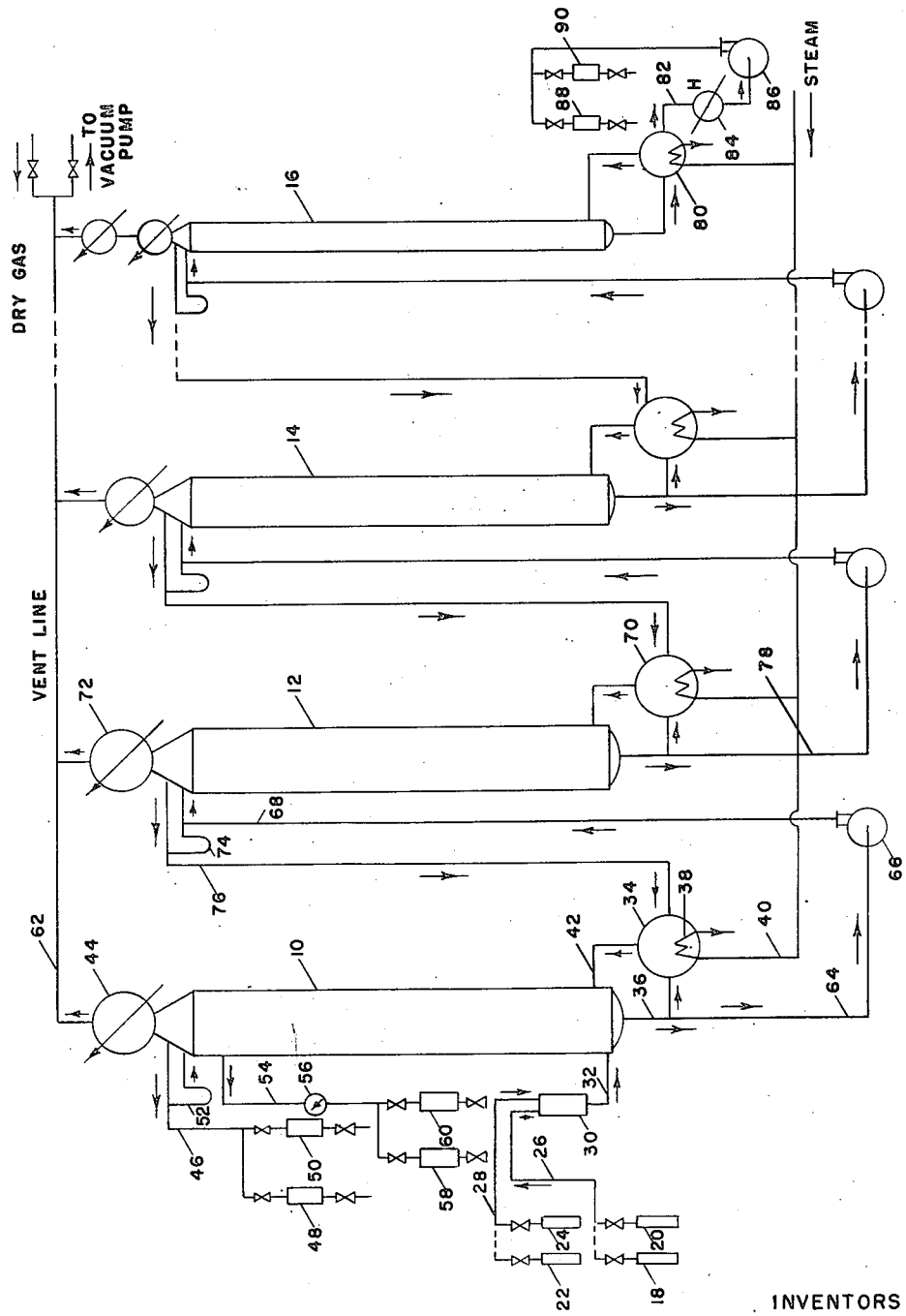

2,796,330

METHOD OF SEPARATING AND CONCENTRATING ISOTOPES OF BORON AND OXYGEN

Ray H. Crist, Leonia, N. J., and Isidor Kirshenbaum, New York, N. Y., assignors to the United States of America as represented by the United States Atomic Energy Commission Application July 4, 1944, Serial No. 543,502

12 Claims. (Cl. 23—205)

This invention relates to a method of separating two difficultly separable materials and more particularly to a method of producing in relatively pure form a desired isotope of an element by concentrating a particular isotopic species of a compound containing that element. Although the method of the invention is particularly well suited for the separation of isotopes, it will be apparent as the description proceeds that it may be used in other cases as well to separate difficultly separable materials.

It is now well established that some chemical elements exist in two or more atomic forms called isotopes and that the different isotopes of an element have the same atomic number but different atomic weights. In some cases individual isotopes have unique properties that differ from the properties exhibited by the mixture of isotopes comprising the chemical element as it normally occurs and it is desirable that methods be available for separating such isotopes from the mixture so that they may be studied and used.

The problem of separating isotopes to recover a particular desired isotope is a difficult one. Since isotopes are different forms of a single chemical element, their chemical properties tend to be practically identical and hence it is usually not feasible to employ conventional chemical methods to effect a separation. Furthermore, the isotopes of an element usually have physical properties that are closely similar and hence there are numerous instances where it is either impossible or exceedingly laborious to employ well-known separative techniques that depend upon differences in physical characteristics such as, for example, mass or vapor pressure.

It is an object of the present invention to provide an improved method for separating two difficultly separable materials.

It is a further object of the invention to provide an improved method of separating different isotopic species of a chemical compound each of which species is capable of containing each of the isotopes of an element of the compound.

It is still another object of the invention to provide a method of separating the boron isotope of mass 10 from the boron isotope of mass 11.

Other objects of the invention will be in part obvious and in part pointed out hereinafter.

In one of its broader aspects the present invention comprises a method of separating two difficultly separable materials by causing the two materials to react with a substance to form dissociable compounds that can exist in two different phases with different degrees of dissociation but substantially the same ratio of substance to material in the two phases and establishing a countercurrent flow of the two phases with respect to one another while maintaining intimate contact between the phases to cause one of the materials to concentrate in one of the two phases and the other material in the other phase. In a somewhat narrower aspect the invention comprises a method of separating the isotopes of an element by forming a dissociable compound of the element which when vaporized dissociates appreciably by a reversible dissociation process but which has substantially the same chemical composition in the two phases, heating the compound to convert a portion thereof into the vapor phase, and establishing a countercurrent flow of the liquid and vapor phases while maintaining the liquid and vapor in intimate contact with one another to cause the different isotopic species of the compound to concentrate in different phases.

The term "dissociable compound" is used in the present specification and claims in a broad sense to comprehend not only chemical compounds in the narrow sense but also complexes.

The term "same chemical composition" is used in the present specification and claims to denote identity of composition in a stoichiometrical sense as distinguished from identity of isotopic composition. It is an essential feature of the present invention that the dissociable compound have substantially the same chemical composition in two different phases. As used in the present specification and claims, the phrase "substantially the same chemical composition" means that any difference in chemical composition that may exist between the two phases is appreciably less than the difference in isotopic composition that exists between the two phases.

For purposes of simplicity of explanation the method of the present invention will be described as applied to the problem of separating the boron isotope of mass 10 from the boron isotope of mass 11, although, as pointed out hereafter, the method is not limited to the separation of these two isotopes, nor is it limited to isotopic separation generally. We have found that an effective separation of the boron isotopes may be achieved by forming a compound, in this case a complex, of boron trifluoride and a lower aliphatic ether such as methyl ether. This complex, which is a liquid that dissociates reversibly in the vapor phase to a substantial extent, is then heated to convert a portion of the liquid into the vapor phase and a countercurrent flow of the liquid and vapor phases is established while maintaining the liquid and vapor phases in intimate contact with one another as, for example, by passing the liquid and vapor countercurrently through a conventional fractionating column such as a packed column.

The chemical composition of the complex of boron trifluoride and methyl ether remains substantially unchanged as it passes through the fractionating column, that is, the relative proportions of ether and boron trifluoride remain substantially constant. The isotopic species of the complex that contains boron of mass 11 tends to move upwardly in the column and the isotopic species containing boron of mass 10 tends to move downwardly in the column. Thus, with a suitable arrangement of apparatus as described in detail below, it is possible by using the method of the present invention to concentrate either or both isotopic species of the complex to any desired extent. The boron isotopes may be recovered from the separated isotopic species of the complex by methods described hereafter.

The precise mechanism of the reaction that occurs when the method of the invention is carried out is not completely understood. While we do not wish to be bound by any particular theory as to this reaction mechanism, the following discussion, which is based on our present understanding of the nature of the reaction, may be of assistance in clarifying certain aspects of our invention.

As pointed out above, the methyl ether-boron trifluoride complex when vaporized dissociates by a reversible reaction that may be represented by the equation:

$$(CH_3)_2O \cdot BF_3 \rightleftharpoons (CH_3)_2O + BF_3$$

The mixture within the column may comprise either liquid complex, complex in vapor form, ether vapor and boron trifluoride gas or liquid complex, ether vapor, and boron trifluoride gas. That is to say, the complex may be either partially or completely dissociated in the vapor phase depending upon the conditions existing within the column and isotopic enrichment will occur in either case.

For the conditions specifically set forth below, the vapor probably contains of the order of a half of the complex undissociated. Under these conditions it may be that the components of the vapor phase not only tend to approach a chemical or dissociation equilibrium, but also tend to approach an isotopic equilibruim as well, and that the nature of the istopic equilibrium is such that the ratio of $B^{10}$ to $B^{11}$ in the undissociated complex is greater than the ratio of $B^{10}$ to $B^{11}$ in the boron trifluoride. Thus, as the liquid complex vaporizes, an isotope exchange reaction takes place according to the following equation:

$$(CH_3)_2O \cdot B^{11}F_3 + B^{10}F_3 \rightleftharpoons (CH_3)_2O \cdot B^{10}F_3 + B^{11}F_3$$

and the undissociated vapor of the complex is enriched with respect to $B^{10}$. Since the undissociated vapor of the complex is also in equilibrium with the liquid complex, the liquid will be similarly enriched with respect to $B^{10}$ and hence by establishing a countercurrent flow of the liquid and vapor phases, an effective separation of the isotopic species may be achieved.

There is some evidence to indicate that in isotope separation the largest separative effect is obtained when the bond which dissociates reversibly is between an atom of the isotopes to be separated and another atom, which may or may not be one of the isotopes. Where, on the other hand, no atom of the isotopes to be separated is adjacent the bond that dissociates reversibly, a smaller separative effect may be expected. Where one atom of the isotopes to be separated is adjacent the bond that dissociates reversibly and another atom of the isotopes to be separated is more or less remote from the bond, an isotope exchange may occur to produce a separative effect intermediate between the two separative effects mentioned above.

From one point of view the method of the present invention may be considered as a novel type of isotope exchange reaction, whereas from another point of view the method may be considered as a novel way of effecting isotopic separation by fractional distillation. However, there are significant differences between the present method and the isotope exchange and fractionation methods of the prior art. Neither prior process makes use of a reversibly dissociable compound or complex to effect an isotopic separation, nor does either utilize an exchange reaction between a dissociable compound and its dissociation products.

The following specific example is given to illustrate the efficiency of the present method in separating the boron isotopes: A batch still system including a packed fractionating column was charged with a quantity of methyl ether-boron trifluoride complex. The liquid complex was heated and the dissociated and undissociated vapors passed through the fractionating column. The vapors leaving the top of the column were condenser and returned to the top of the column as liquid complex. The fractionating column was 3″ in diameter and was packed with Stedman packing to a height of 47″ which was equivalent to approximately 30 theoretical plates. The system was operated at an absolute pressure of 5″ of mercury and total reflux, the rate of heat supply being such as to give a reflux rate of 1.05 gallons per hour. Under these conditions the temperature at the bottom of the column was about 90° C. After 20 hours of operation, samples were taken at the top and bottom of the tower and analyzed for isotopic content by means of a mass spectrometer. It was found that ratio of $B^{11}$ to $B^{10}$ at the top of the column was 1.65 times as great as the ratio of $B^{11}$ to $B^{10}$ at the bottom of the column. Since the total number of theoretical plates was about 30, the effective separation obtained per plate may be calculated to be 1.017 for this column.

It has been found that there is a tendency for the complex to decompose to form a methyl borate complex and methyl fluoride, probably according to the following equation:

$$3(CH_3)_2O \cdot BF_3 \rightarrow (CH_3O)_3B \cdot 2BF_3 + 3CH_3F$$

The methyl borate complex boils at 86° C. to 87° C. at atmospheric pressure and the methyl fluoride is a gas at ordinary temperatures. Since both compounds are more volatile than the ether complex, they tend to concentrate at the top of the column. The rate of decomposition is a function of temperature as indicated in the following table which gives the decomposition obtained per day at various temperatures:

| Temp. in ° C.: | Decomposition percent per day |
|---|---|
| 90 | 0.20 |
| 103 | 0.61 |
| 114 | 4.30 |

From the above data it is apparent that it will usually be desirable to carry out the reaction at a pressure sufficiently low to cause the ether complex to boil at a temperature of not more than about 105° C. in order to avoid excessive decomposition.

The method of the present invention is well adapted for continuous operation and apparatus capable of carrying out the present method on a continuous scale is diagrammatically illustrated in the accompanying drawing. The purpose of the apparatus shown in the drawing is to concentrate the isotopic species of the complex containing boron of mass 10.

Referring to the drawing, the apparatus there disclosed comprises a series of columns 10, 12, 14, and 16. Since a relatively large number of theoretical plates are required to effect a separation of the isotopic species of the complex, the columns 10 to 16 are preferably packed columns filled with a suitable packing material such as Raschig rings or the so-called Stedman packing. As indicated by the dotted lines between columns 14 and 16, the number of columns used is a variable and depends upon the extent to which it is desired to concentrate the product.

As indicated at the left-hand portion of the drawing, methyl ether from one of a pair of feed tanks 18 and 20 and boron trifluoride from one of a pair of feed tanks 22 and 24 are fed through the conduits 26 and 28 respectively to a reaction chamber 30 wherein they react to form a liquid complex which passes through conduit 32 to the base of column 10. Heat to vaporize the complex is supplied by a boiler 34 that receives liquid complex from the base of column 10 through a conduit 36. The liquid complex within the boiler 34 is heated by means of a steam coil 38 that is supplied with steam from a steam pipe 40. The vapors formed in the boiler 34 pass through conduit 42 to the base of column 10 and thence upwardly through the column to a condenser 44 where they condense.

As previously pointed out, there is a tendency for the complex to decompose and it is thus apparent that the condensate contains a proportion of the decomposition product referred to above. The condensate is also enriched with respect to the $B^{11}$ species of the complex. To prevent the quantity of decomposition product from building up in the system, a relatively small proportion of the condensate is continuously withdrawn through conduit 46 and passes to one of a pair of storage tanks 48 and 50. The major portion of the condensate is returned through pipe 52 to the column as reflux. A second portion of the liquid is withdrawn from the column as product at a point somewhat below the top of the column through conduit 54 and passes through a cooler 56 to one of a pair of storage tanks 58 and 60. Since boron of normal isotopic abundance contains approximately 81.6%

$B^{11}$ and 18.4% $B^{10}$, the mixture of isotopic species of the complex entering the column through pipe 32 will have this same isotopic distribution. The rate of withdrawal of complex through pipe 54 should be so adjusted that the rate of withdrawal of the $B^{11}$ species of the complex is such as to give an overall material balance in the system.

The column 10 is preferably operated under reduced pressure and this reduced pressure may be obtained by means of a vacuum pipe 62 leading from condenser 44 to a vacuum pump (not shown). Any non-condensible decomposition products such as methyl fluoride that may be formed in the boiler 34 or column 10 pass out of the system through the pipe 62.

A portion of the liquid complex from the base of column 10 passes through conduit 64 to a pump 66 and is pumped through conduit 68 to the top of column 12. Near the base of column 12 there is a boiler 70 which is similar in construction and function to the boiler 34 and vaporizes a portion of the liquid complex flowing downwardly through column 12. The vapors at the top of column 12 are condensed by a condenser 72 and the condensate is divided, a portion of the condensate returning to the top of column 12 through conduit 74 as reflux and the remainder of the condensate being returned through conduit 76 to the boiler 34.

It will be appreciated that the operation of column 12 is such that the liquid complex leaving the bottom of the column is further enriched with respect to the $B^{10}$ species. This enriched complex passes from the bottom of column 12 through conduit 78 to column 14 and then successively through the other columns of the system to become successively enriched with respect to the $B^{10}$ species. The operation of the other columns in the system is similar to that of column 12.

A product having a relatively high concentration of the $B^{10}$ species is withdrawn from the last column 16 of the system, specifically, from the boiler 80 through a pipe 82. The product passes through a cooler 84 and is pumped by a pump 86 to one of a pair of product tanks 88 and 90. If desired, the boron isotope of mass 10 may be recovered from the enriched product in the form of boron trifluoride. It has been found that relatively high yields of boron trifluoride may be obtained by heating the liquid complex with anhydrous calcium fluoride, first at a relatively low temperature to remove the ether and form a $CaF_2 \cdot BF_3$ complex and then at a relatively higher temperature to decompose the $CaF_2 \cdot BF_3$ complex and recover substantially pure boron trifluoride. This method of recovering boron trifluoride from an alkyl ether complex is described in more detail in a copending application of Isidor Kirshenbaum, Serial No. 575,352 filed January 30, 1945, now abandoned.

It is apparent that if a decomposition product is formed which is less volatile than the compound or complex being used, the decomposition product may be withdrawn from the system near the bottom of column 16 in a manner similar to that in which decomposition product is withdrawn from the top of column 10.

It is to be understood that the foregoing description is illustrative only. Thus, the application of the method of the present invention to the separation of boron isotopes has been phrased in terms of the use of the methyl ether complex of boron trifluoride although other complexes may be effectively used as well. For example, the ethyl ether or methyl borate complex of boron trifluoride may be used. The ethyl ether complex has been found to be somewhat more sensitive to decomposition than the methyl ether complex and hence it is usually preferable to employ the latter in the separation of boron isotopes.

As pointed out above, the method of the invention is not limited to the separation of any particular isotopes nor is it limited to the separation of isotopes generally. It has been found, for example, that the isotopes of oxygen may be separated by the present method. When the methyl ether complex of boron trifluoride is used, an effective separation per theoretical plate of about 1.012 may be obtained. The $O^{16}$ tends to concentrate at the top of the column and the $O^{18}$ at the bottom of the column. The oxygen isotopes may be recovered from the complex in any suitable manner. Thus the complex may be decomposed and the oxygen recovered in the form of methyl ether by heating with calcium fluoride as described above or by heating with sodium fluoride or other metal halides.

The method of the invention is generally applicable to the separation of difficultly separable materials which form reversibly dissociable complexes that can exist in two different phases with different degrees of dissociation. The method may also be carried out with mixtures which have the same chemical composition in two phases, for example, certain constant boiling mixtures. Furthermore, separation can be effected as either a batch operation or continuous operation.

From the above description it may be seen that the present invention provides an unusually effective method of separating difficultly separable materials. Since many embodiments might be made of the above described invention and since many changes might be made in the embodiment illustratively disclosed herein, it is to be understood that all matter hereinabove set forth is to be interpreted as illustrative only and not in a limiting sense.

We claim:

1. The method of separating boron isotopes which comprises forming a liquid boron-containing complex compound that is capable of dissociating reversibly in the vapor phase and has substantially the same chemical composition in the liquid and vapor phases, heating said liquid complex compound to convert a portion thereof into the vapor phase, and establishing a countercurrent flow of said liquid phase and said vapor phase while maintaining said liquid and said vapor in intimate contact with one another, whereby one of said boron isotopes tends to concentrate in the vapor phase.

2. The method of separating the boron isotope of mass 10 from the boron isotope of mass 11 which comprises the steps of forming a liquid complex with boron trifluoride which is appreciably dissociated in the vapor phase and which has different isotopic species containing said two boron isotopes, heating said liquid complex to convert a portion thereof into the vapor phase, establishing a countercurrent flow of said liquid phase and said vapor phase in a countercurrent system while maintaining said liquid and said vapor in intimate contact with one another, whereby the species of said complex containing the isotope of mass 11 tends to concentrate in the vapor phase and the species of said complex containing the isotope of mass 10 tends to concentrate in the liquid phase, and removing said two isotopic species from the points in said system at which they tend respectively to concentrate.

3. The method of separating the boron isotope of mass 10 from the boron isotope of mass 11 which comprises forming a complex of boron trifluoride and an aliphatic ether, heating said complex to convert a portion thereof into the vapor phase, establishing a countercurrent flow of said liquid phase and said vapor phase in a countercurrent system while maintaining said liquid and said vapor in intimate contact with one another, whereby the isotopic species of said complex containing boron of mass 10 tends to concentrate in the liquid phase and the isotopic species of said complex containing boron of mass 11 tends to concentrate in the vapor phase, and withdrawing said two isotopic species from the system near the points at which they tend to concentrate.

4. The method of separating the oxygen isotope of mass 16 from the oxygen isotope of mass 18 which comprises forming a complex of boron trifluoride and an aliphatic ether, heating said complex to convert a portion thereof into the vapor phase, establishing a countercurrent flow of said liquid phase and said vapor phase in a countercurrent system while maintaining said liquid and said vapor in intimate contact with one another, whereby the isotopic species of said complex containing oxygen of mass 16 tends to concentrate in the vapor phase and the isotopic species of said complex containing oxygen of mass 18 tends to concentrate in the liquid phase, and withdrawing said two isotopic species from the system near the points at which they tend to concentrate.

5. The method of separating the boron isotope of mass 10 from the boron isotope of mass 11 which comprises forming a complex of boron trifluoride and methyl ether, heating said complex to convert a portion thereof into the vapor phase, establishing a countercurrent flow of said liquid phase and said vapor phase in a countercurrent system while maintaining said liquid and said vapor in intimate contact with one another, whereby the isotopic species containing boron of mass 10 tends to concentrate in the liquid phase and the isotopic species containing boron of mass 11 tends to concentrate in the vapor phase, and withdrawing said two isotopic species from the system near the points at which they tend to concentrate.

6. The method of separating the oxygen isotope of mass 16 from the oxygen isotope of mass 18 which comprises forming a complex of boron trifluoride and methyl ether, heating said complex to convert a portion thereof into the vapor phase, establishing a countercurrent flow of said liquid phase and said vapor phase in a countercurrent system while maintaining said liquid and said vapor in intimate contact with one another, whereby the isotopic species of said complex containing oxygen of mass 16 tends to concentrate in the vapor phase and the isotopic species of said complex containing oxygen of mass 18 tends to concentrate in the liquid phase, and withdrawing said two isotopic species from the system near the points at which they tend to concentrate.

7. The method of separating the boron isotope of mass 10 from the boron isotope of mass 11 which comprises forming a complex of boron trifluoride and methyl borate, heating said complex to convert a portion thereof into the vapor phase, establishing a countercurrent flow of said liquid phase and said vapor phase in a countercurrent system while maintaining said liquid and said vapor in intimate contact with one another, whereby the isotopic species containing boron of mass 10 tends to concentrate in the liquid phase and the isotopic species containing boron of mass 11 tends to concentrate in the vapor phase, and withdrawing said two isotopic species from the system near the points at which they tend to concentrate.

8. The method of separating the boron isotope of mass 10 from the boron isotope of mass 11 which comprises forming a complex of boron trifluoride and ethyl ether, heating said complex to convert a portion thereof into the vapor phase, establishing a countercurrent flow of said liquid phase and said vapor phase in a countercurrent system while maintaining said liquid and said vapor in intimate contact with one another, whereby the isotopic species of said complex containing boron of mass 10 tends to concentrate in the liquid phase and the isotopic species of said complex containing boron of mass 11 tends to concentrate in the vapor phase, and withdrawing said two isotopic species from the system near the points at which they tend to concentrate.

9. The method of separating the boron isotope of mass 10 from the boron isotope of mass 11 which comprises forming a complex of boron trifluoride and methyl ether, heating said complex to convert a portion thereof into the vapor phase, establishing a countercurrent flow of said liquid phase and said vapor phase in a countercurrent system while maintaining said liquid and said vapor in intimate contact with one another, whereby the isotopic species containing boron of mass 10 tends to concentrate in the liquid phase and the isotopic species containing boron of mass 11 tends to concentrate in the vapor phase, withdrawing liquid complex from said system near the point in said system at which the species of said complex containing $B^{10}$ tends to concentrate, and heating the withdrawn complex with anhydrous calcium fluoride to recover boron trifluoride containing a relatively high concentration of $B^{10}F_3$.

10. The method of separating the boron isotope of mass 10 from the boron isotope of mass 11 which comprises forming a complex of boron trifluoride and ethyl ether, heating said complex to convert a portion thereof into the vapor phase, establishing a countercurrent flow of said liquid phase and said vapor phase in a countercurrent system while maintaining said liquid and said vapor in intimate contact with one another, whereby the isotopic species of said complex containing boron of mass 10 tends to concentrate in the liquid phase and the isotopic species of said complex containing boron of mass 11 tends to concentrate in the vapor phase, withdrawing liquid complex from said system near the point in said system at which the species of said complex containing $B^{10}$ tends to concentrate, and heating the withdrawn complex with anhydrous calcium fluoride to recover buron trifluoride containing a relatively high concentration of $B^{10}F_3$.

11. The method of separating the boron isotope of mass 10 from the boron isotope of mass 11 which comprises forming a complex of boron trifluoride and methyl borate, heating said complex to convert a portion thereof into the vapor phase, establishing a countercurrent flow of said liquid phase and said vapor phase in a countercurrent system while maintaining said liquid and said vapor in intimate contact with one another, whereby the isotopic species of said complex containing boron of mass 10 tends to concentrate in the liquid phase and the isotopic species of said complex containing boron of mass 11 tends to concentrate in the vapor phase, withdrawing liquid complex from said system near the point in said system at which the species of said complex containing $B^{10}$ tends to concentrate, and heating the withdrawn complex with anhydrous calcium fluoride to recover boron trifluoride containing a relatively high concentration of $B^{10}F_3$.

12. The method of concentrating a particular isotope of an element selected from the group consisting of boron and oxygen which comprises forming a liquid complex compound containing boron and oxygen that is capable of dissociating reversibly in the vapor phase and has substantially the same chemical composition in the liquid and vapor phase, heating said complex compound to convert a portion thereof into the vapor phase, and establishing a countercurrent flow of said liquid phase and said vapor phase while maintaining said liquid and said vapor in intimate contact with one another, whereby one of said isotopes of one of said elements tends to concentrate in the vapor phase.

References Cited in the file of this patent

UNITED STATES PATENTS

| | | |
|---|---|---|
| 2,218,342 | Pegram | Oct. 15, 1940 |
| 2,339,576 | Luten | Jan. 18, 1944 |
| 2,348,683 | McKenna | May 9, 1944 |